May 25, 1965   N. G. OLSEN   3,184,869
DOZER HYDRAULIC TILT AND PITCH CONTROL
Filed Sept. 30, 1963   3 Sheets-Sheet 1

Inventor
Norman G. Olsen
By Charles C. Schurch
Attorney

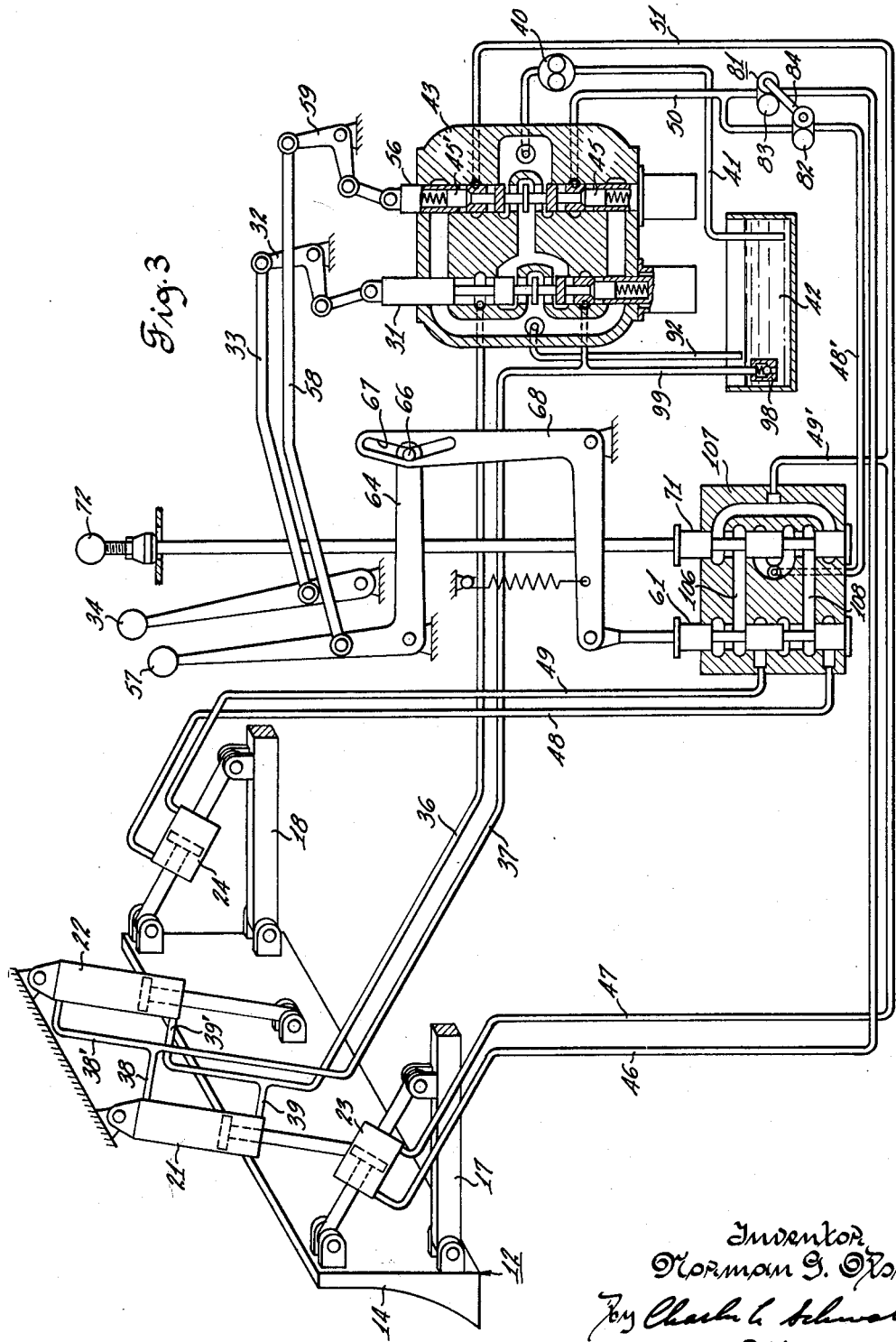

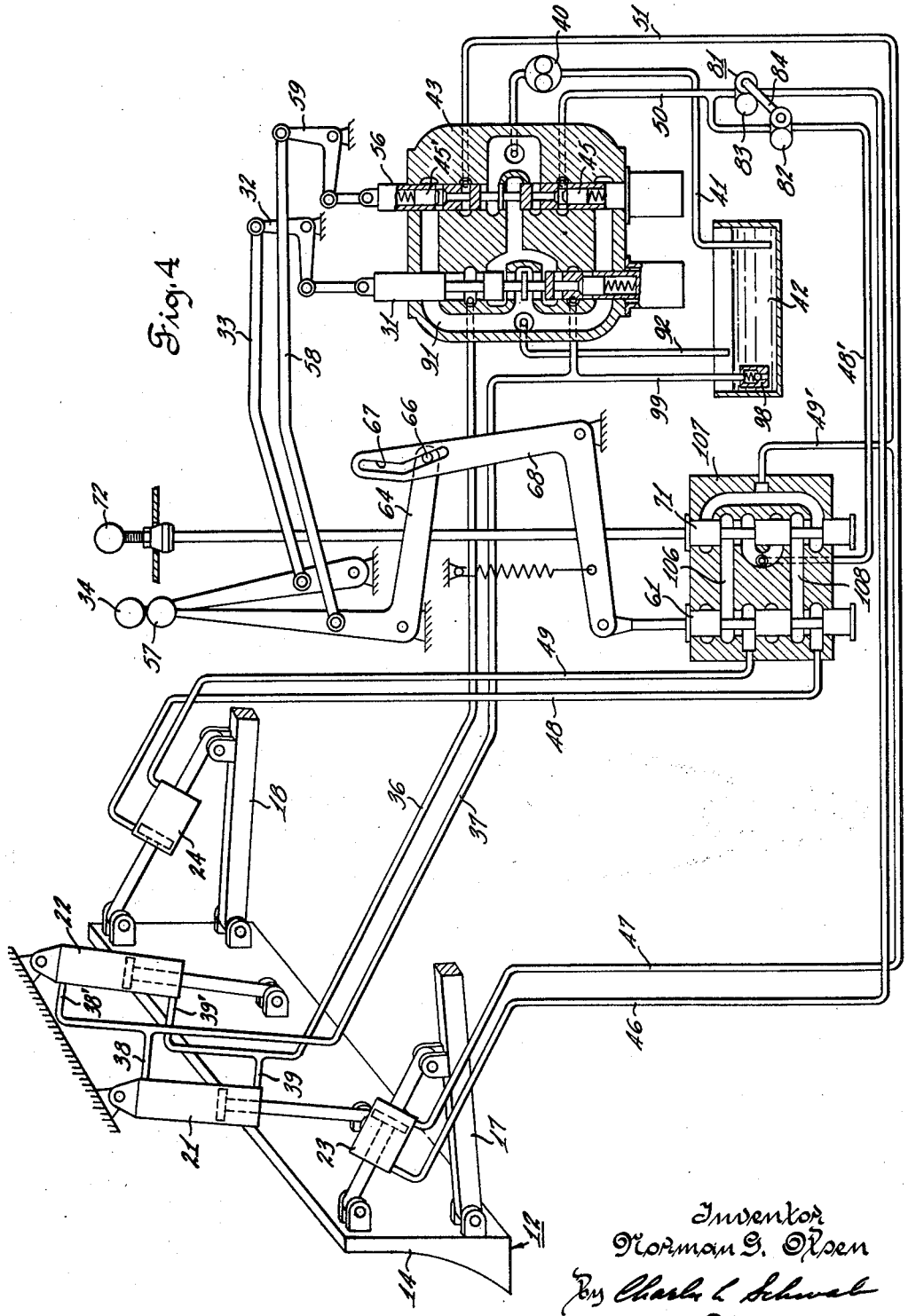

United States Patent Office 3,184,869
Patented May 25, 1965

3,184,869
DOZER HYDRAULIC TILT AND PITCH CONTROL
Norman G. Olsen, Highland Park, Ill., assignor to Allis-Chalmers Manufacturing Company, Milwaukee, Wis.
Filed Sept. 30, 1963, Ser. No. 312,467
3 Claims. (Cl. 37—144)

This invention relates to an improved hydraulic control system for a dozer and more particularly to a new control system for effecting tilt and pitch of a dozer blade.

It is a primary object of this invention to provide a hydraulic control system for a pair of pitch jacks of a bulldozer attachment whereby the pitch jacks may be operated to not only effect pitching of the blade but also to effect tilting of the blade.

It is a further object of this invention to provide a control system for the pitch jacks of a bulldozer blade which employs a separate valve mechanism for switching from pitch control to tilt control using the same pitch jacks and pitch jack control valve.

It is a further object of this invention to provide a combined pitch and tilt control for a dozer using a pair of pitch jacks and means for preventing the dozer and its control means from being subjected to excessive forces.

It is a further object of this invention to provide a combined pitch and tilt control for a pair of parallel connected pitch jacks wherein means are provided to insure approximately equal fluid delivery to the pitch jacks and wherein means are provided to prevent transfer of fluid from one pitch jack to the other when they are not being actuated.

It is a further object of this invention to provide a dozer control system employing a pair of transversely spaced lift jacks and a pair of pitch and tilt jacks which use two standard control valves, reversing and locking means for the pitch and tilt jacks and wherein means are provided to prevent excessive forces in the hydraulic system and in the dozer structure.

These and other objects of this invention will be apparent to those familiar with the art upon reference to the following description and accompanying drawings in which:

FIG. 3 is a schematic illustration of the present invention with the dozer blade in a nontilted condition;

FIG. 4 is a schematic illustration of the present invention with the dozer blade in a tilted condition.

Figure 1:
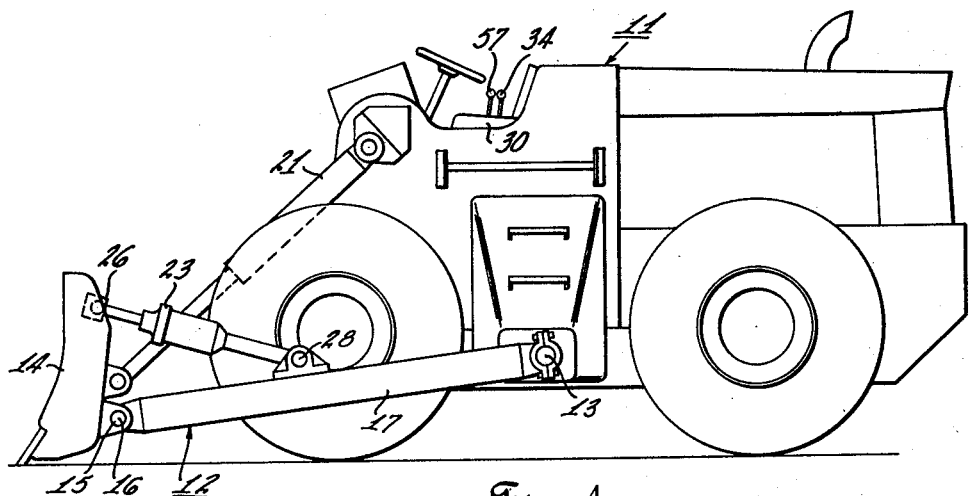
FIG. 1 illustrates a side view of a four wheel rubber tired dozer tractor in which the present invention is incorporated.
Figure 2:
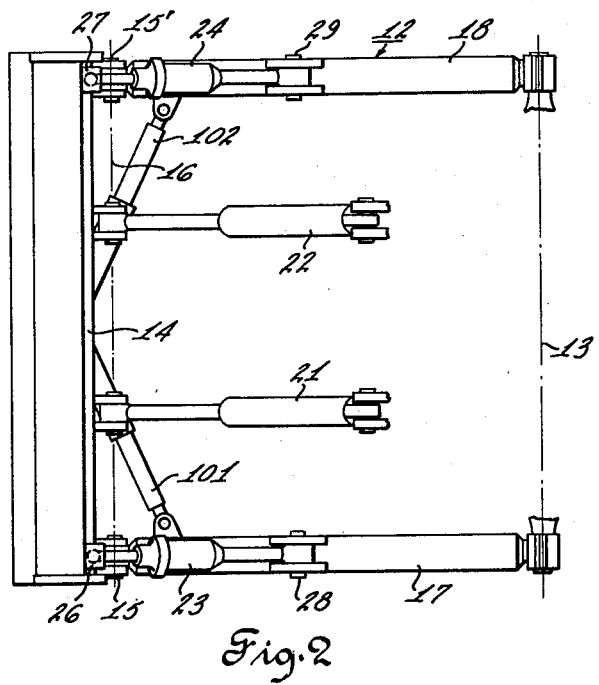
FIG. 2 is a top view of the dozer attachment shown in FIG. 1 and its lift jacks.

Referring to FIGS. 1 and 2, the four wheel rubber tired vehicle 11 supports a dozer attachment 12 which is pivotally connected through its push beams 17, 18 to transversely opposite sides of the vehicle main frame on a transverse axis 13 for vertical swinging movement. The forward ends of the push beams 17, 18 are pivotally connected to a dozer blade 14 by pivot connections 15, 15' for pivotal movement about a transverse axis 16. Struts 101, 102 serve to brace the push beams 17, 18 relative to the blade 14 between which they are pivotally interconnected. A pair of double acting hydraulic lift jacks 21, 22 for raising and lowering the dozer attachment 12 are pivotally connected at their opposite ends to the vehicle 11 and dozer blade 14. A pair of double acting hydraulic tilt and pitch control jacks 23, 24 interconnect the top of the dozer 14 and the push beams 17, 18 through a pair of transversely spaced pivot connections 26, 27 above axis 16 and pivot connections 28, 29 rearwardly of axis 16. The various pivot connections may be ball and socket or pin ball and socket, or other suitable and well known constructions.

Referring to FIG. 3, the hydraulic control valve 31 for operating lift jacks 21, 22 is connected to a manual control lever 34 at the operator's station 30 through bell crank 32 and link 33. As illustrated in FIG. 3, the valve 31 is in a hold position in which fluid flow to and from the lift jack supply conduits 36, 37 is blocked. The lift jack branch conduits 38, 38', 39, 39' permit equalization of pressure and connect the lift jacks in parallel. A fluid pump 40 draws fluid from the reservoir 42 through conduit 41 and delivers the fluid to the valve housing 43 in which the lift jack control valve 31 and the pitch and tilt control valve 56 are housed. The valves 31 and 56 employ open center valve spools which in their neutral or hold position, illustrated in FIG. 3, permit pumped fluid to return to reservoir through reservoir conduit 92.

My novel control for pitch and tilt of a bulldozer blade includes a pair of double acting pitch jacks 23, 24 pivotally connected, respectively, to blade 14 and to the push beams 17, 18, and control means for operating the pitch jacks including valve 56 which is operated through a manual control lever 57, link 58 and bell crank 59. Pitch jack branch conduits 46, 47, 48, 49 connect pitch jacks 23, 24, in parallel and pitch jack supply conduits 50, 51 connect the branch conduits 46, 47, 48, 49 to the pitch jack control valve 56.

I provide a locking valve 61 which is automatically placed in a fluid locking position, wherein conduits 48, 49 to jack 24 are blocked, whenever the control valve 56 is in its neutral or hold position, as shown in FIG. 3. The pitch jack control lever 57 has an arm 64 with a projecting pin 66 extending into a double tapered slot 67 formed in bell crank 68. Bell crank 68 is connected at its opposite end to valve 61. Thus movement of pitch jack control lever 57 in either direction automatically unlocks conduits 48, 49. The locking valve 61 prevents interchange of fluid between corresponding ends of the pitch jacks 23, 24 when the pitch jack control valve 56 is in its hold position. Thus the pitch jacks 23, 24 act as rigid struts during dozing operations, preventing tilting of the blade under eccentric load.

In order to cause the pitch cylinders to also act as tilt cylinders, I provide a function selector valve 71, which I will also refer to as a reversing valve. The reversing valve 71 has a control rod extending upwardly, terminating in a knob 72, and is manually operable to reverse the fluid connections to pitch jack 24. In the pitch position of the reversing valve 71, the segment of branch conduit 49 designated 49' is connected to interior passage 106 in valve housing 107 and the segment of branch conduit 48 designated 48' is connected to interior passage 108. Upon operation of the pitch control valve 56, the locking valve 61 will be moved automatically from its closed to its open position connecting interior passages 106, 108 to the portions of conduits 49, 48 extending to jack 24. Thus, when the reversing valve 71 is in its pitch position, as shown in FIG. 3, movement of the pitch jack control lever 57 to the right retracts the pitch jacks 23, 24 and movement of lever 57 to the left expands them.

A flow divider 81 in the form of two gear pumps 82, 83, interconnected by a shaft 84 to operate in unison, insures approximately equal flow to each of conduits 46, 48' of the jacks 23, 24. This insures each pitch jack being actuated approximately the same amount.

Referring to FIG. 4, the dozer blade has been tilted downwardly on its left side and upwardly on its right side. Control valve 56 has been moved upwardly by movement of control lever 57 to the right, thereby directing fluid delivered by the pump 40 to supply conduit 50 through check valve 45 in valve 56, the fluid then being equally divided by flow divider 81 as it passes to branch conduits 46, 48'. Function selector valve 71 which has been moved to its tilt position, directs fluid from segment 48' to conduit 49 and fluid from conduit 48 to segment 49' from whence it is returned to reservoir through supply conduit 51, check valve 45', chamber 91 and return conduit 92. Branch conduit 46 delivers fluid to the rod end of jack 23 and its closed end is connected to supply conduit 51 through branch conduit 47. After the blade 14 is tilted to the extent desired, the control valve 56 is returned to neutral and the locking valve is simultaneously returned to its locking position thereby locking the jacks 23, 24 in their adjusted positions.

Before tilting the dozer blade 14 right or left it is usually desirable to extend the pitch jacks to about one half their stroke, although this is not an absolute requirement since some leakage through the flow divider 81 is possible and since the flow divider can free wheel (draw a vacuum with one of the two gear pumps 82, 83).

Figure 5:
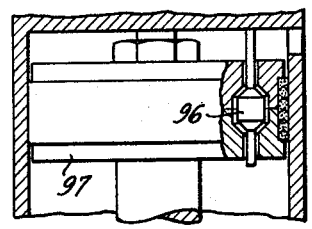
FIG. 5 is a section view showing the unloading valve in the piston of the lift jacks.

If the lift jacks are in a fully retracted position and the blade is tilted right or left, the piston of one of the lift jacks will be forced to extend and the fluid will transfer from its rod end to the rod end of the other lift jack. As shown in FIG. 5, the unloading valve 96 in piston 97 of the lift jacks permits the fluid to transfer to the upper side of the piston, thence to the closed end of the extended lift jack. Since a differential area lift jack is used, a partial vacuum in supply conduit 36 will be created and this will open check valve 98 to permit make-up fluid to be drawn into conduit 36 through bypass passage 99. A conventional relief valve, not shown, is provided for lift jack supply conduit 37.

My pitch and tilt control has a self leveling aspect which is a time saving convenience to the operator. When the blade is in a tilt position and the operator moves the reversing valve to its pitch position and then moves valve 56 to an actuating position, the parallel connection of the jacks 23, 24 during actuation allows the blade to be leveled by fully extending both tilt jacks 23, 24.

My control system provides tilt and pitch control for a dozer blade using only two pitch jacks and a single lever for operating them, once the operator selects the function desired with the reversing valve 71. The flow divider insures coordinated movement and the locking valve effectively holds the blade in the position of tilt or pitch to which it is adjusted.

The embodiments of the invention in which an exclusive property or privilege is claimed are defined as follows:

1. In combination:
    a dozer blade,
    a pair of push beams having their front ends pivotally connected to the lower rear of said dozer blade on a transverse axis and their rear ends adapted for connection to a propelling vehicle,
    a pair of double acting hydraulic jacks pivotally connected, respectively, to transversely spaced points on the upper rear of said blade and to said push beams in spaced relation to said axis, and
    hydraulic control means for pitching said blade by expanding and contracting said jacks together and for tilting said blade by expanding one of said jacks and contracting the other including
    a control valve,
    a pair of supply conduits connected to said control valve,
    branch conduits connecting said jacks in parallel to said supply conduits,
    a reversing valve in the branch conduits connected to one of said jacks for selectively reversing the fluid connections to said one jack,
    a locking valve in at least one of said branch conduits having an open position in which said locking valve permits fluid flow in said one conduit and a locking position in which fluid flow in said one conduit is blocked,
    a first control means for simultaneously operating said control valve and locking valve and
    a second control means for operating said reversing valve independently of said control and locking valves.

2. The combination set forth in claim 1 and further comprising a flow divider connected to one of said main supply conduits and to the two of said branch conduits connected thereto, said flow divider insuring substantially equal flow in said two branch conduits.

3. In combination:
    a pair of laterally spaced push beams adapted at their rear ends for connection to a propelling vehicle, and
    a dozer blade pivotally connected on a transverse axis to the front ends of said push beams,
    a pair of double acting hydraulic pitch jacks operatively connected, respectively, to laterally spaced points on said dozer and connected, respectively, to said push beams,
    a pitch and tilt control system for said pitch jacks including
    a pair of supply conduits,
    a first pair of branch conduits connecting opposite ends of one of said pitch jacks to said supply conduits,
    a second pair of branch conduits connecting opposite ends of the other of said pitch jacks to said supply conduit in parallel relation to said one jack,
    means for blocking the flow of fluid from one of said pitch jacks through one of said branch conduits when said one branch conduit is not supplied pressurized fluid,
    hydraulic valve means operatively connected to said supply and branch conduits for effecting expansion and contraction of said pitch jacks in unison to pitch said blade and for effecting expansion of one of said pitch jacks and contraction of the other of said jacks to tilt said blade, and
    flow divider means connected to only one of said supply conduits and to the two branch conduits connected thereto for effecting substantially equal flow in said two branch conduits.

References Cited by the Examiner
UNITED STATES PATENTS

| | | | |
|---|---|---|---|
| 2,103,530 | 12/37 | Henry | 37—144 |
| 2,109,393 | 2/38 | Le Bleu | 37—144 |
| 2,190,346 | 2/40 | Austin | 37—144 |
| 2,224,725 | 12/40 | Felt | 37—144 |
| 2,543,989 | 3/51 | Rockwell | 37—144 |
| 2,766,536 | 10/56 | Perkins | 37—144 |
| 2,942,363 | 6/60 | Long | 37—144 |

ABRAHAM G. STONE, *Primary Examiner.*
WILLIAM A. SMITH III, *Examiner.*